Figure 1:
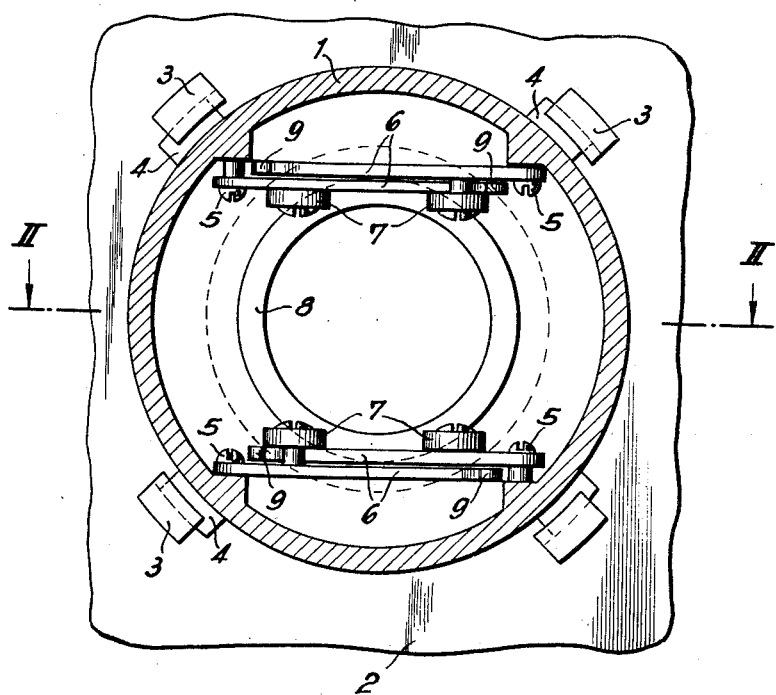

Nov. 24, 1953

H. NAUMANN 2,660,527

DEVICE FOR EXCHANGEABLE OBJECTIVES OF PHOTOGRAPHIC CAMERAS

Filed Jan. 12, 1953

5 Sheets-Sheet 1

INVENTOR
Helmut Naumann
BY Mock. Blum
ATTORNEYS

Nov. 24, 1953

H. NAUMANN 2,660,527

DEVICE FOR EXCHANGEABLE OBJECTIVES
OF PHOTOGRAPHIC CAMERAS

Filed Jan. 12, 1953

5 Sheets-Sheet 3

INVENTOR
Helmut Naumann
By: Moeic - Blum
ATTORNEYS

Nov. 24, 1953

H. NAUMANN 2,660,527

DEVICE FOR EXCHANGEABLE OBJECTIVES
OF PHOTOGRAPHIC CAMERAS

Filed Jan. 12, 1953

5 Sheets-Sheet 4

INVENTOR
Helmut Naumann
BY: Moer-Blum
ATTORNEYS

Nov. 24, 1953

H. NAUMANN 2,660,527

DEVICE FOR EXCHANGEABLE OBJECTIVES OF PHOTOGRAPHIC CAMERAS

Filed Jan. 12, 1953

5 Sheets-Sheet 5

INVENTOR
Helmut Naumann
BY: Moen & Blum
ATTORNEYS

Patented Nov. 24, 1953

2,660,527

UNITED STATES PATENT OFFICE 2,660,527

DEVICE FOR EXCHANGEABLE OBJECTIVES OF PHOTOGRAPHIC CAMERAS

Helmut Naumann, Braunschweig, Germany, assignor to Voigtlander, A. G., Braunschweig, Germany, a corporation of Germany Application January 12, 1953, Serial No. 330,611

Claims priority, application Germany January 15, 1952

14 Claims. (Cl. 95—44)

This invention relates to exchangeable photographic objectives having different focal lengths and to photographic cameras containing a range finder coupled with means for displacing the objective, whereby the mechanical means for displacing the objective are arranged within the camera and are tuned for a predetermined original focal length, with the range finder. The invention relates to objectives, in which the exchangeable or removable principal objective is subjected to axial displacement only and is not subjected to rotation during its adjustment.

In some of the known photographic cameras the means for near focusing are not arranged within the camera but in the individual exchangeable objectives, whereby an adjusting movement derived from the displacement of the objective is transmitted to the range finder housed by the camera. In some other known camera constructions the means for effecting displacement of the objective are arranged within the camera, but these means impart to the objective a rotary motion in addition to the axial displacement. Finally, photographic cameras have been suggested, in which the necessary adjustment of exchangeable objectives having different focal lengths, is derived from the rotation of a mounting element and from the axial displacement of another element.

These known suggestions have various disadvantages which are eliminated by the present invention.

According to this invention, the camera contains the adjusting device which is coupled with a built-in range finder and adjusted to the basic focal length whereby the basic objective is subjected to axial displacement only. Rotary motions which can be easily brought about mechanically, but have disadvantages in use, do not occur in carrying out the present invention.

According to the invention, the objectives, the focal lengths of which are different from the focal lengths of the basic objective, are displaceably journalled in a tube, which is fixedly connected to the camera casing by known means, e. g. a bayonet ring, so that it is not moved during sharp focusing. The tube also contains axially displaceable members, for example intermediate rings provided with fastening means, said members being connected with parts of the camera at least by positive engagement and effecting axial movement corresponding to that of the basic or principal objective, during sharp focusing. Between these last mentioned elements and the objective displaceably housed by the tube according to the invention, a lever transmission is arranged, which imparts an adjusting movement to the objective, relative to the stationary tube. The ratio of this adjusting movement to the adjusting movement of the basic or principal objective, corresponds to the ratio of squares of the focal lengths. This can be attained, for example, by using in the lever transmission one-armed levers having two points of attack, or two-armed levers, the effective lever lengths of which correspond to the above mentioned ratio. For example in the case of an objective having double focal length in comparison with the basic objective, a short lever engages the camera part, displacement of which corresponds to that of the basic objective, while a lever arm which is four times longer, lies against the objective of longer focal length, which is displaceable in the tube. The pivot is arranged in the stationary tube.

Deviations from the above stated ratio of squares of the focal lengths are due to the fact that the distance determined by the range finder is not measured from the front focal point of the objective—as it would be necessary in accordance with Newton's well known image equation—but from the location of the range finder, which is usually arranged near the rear focal plane of the objective. The necessary correction resulting from this can be approximately effected by a slight modification of the lever lengths, or by causing the forces to act on the levers not perpendicularly but under an angle which is variable also in accordance with the location of the lever.

In order to reduce friction of the axially displaceable mounting elements to a minimum and to avoid tilting or canting of the displaceable elements in the stationary guides of the tube, it is necessary to arrange a plurality of levers as symmetrically as possible, around the optical axis. For example three levers staggered by 120° each, surrounding the pencil of rays, can be used, whereby a triangular space is left free. Or four levers can be used, which are arranged pair-wise on both sides of the optical axis, opposite to each other.

It will be understood that, in order to further reduce friction, rollers, ball bearings and the like can be used, in a manner known per se, in connection with the levers as well as the parts adapted to be axially displaced in the tube. Furthermore, in carrying out the present invention, play caused by mechanical imperfections can be eliminated in known manner by spring force.

The intermediate member acting on the mounting of the basic or principal objective, can be caused to lie against said mounting by spring effect. However, it is preferable to replace this merely positive engagement by an engagement brought about by the form of the engaging members. For example, the same coupling elements as those provided on the basic or principal objective for its fastening to the camera, can be provided for on said intermediate member.

The entire system or device described above can be used not only for objectives having longer focal lengths than that of the basic or principal objective but also for objectives having shorter focal lengths, i. e. wide angle objectives. In this case, displacement of the objectives derived from selection of the lever lengths, is, of course, smaller than that of the base or standard objective.

In the case of objectives, the focal lengths of which are several times longer than the focal length of the base or standard objective, the necessary displacement is very considerable and the transmission ratio of the levers must be increased to such extent that considerable forces have to be transmitted by the adjusting device of the camera. This may result in elastic or permanent deformations of individual parts of the camera. If the base or standard objective has for example a focal length of 50 mm. and an objective of long focal length, the latter amounting to 100 mm., the transmission ratio of the lever arrangement must be 4:1. In order to reduce this ratio, at least in objective types suitable therefor—for example in objectives comprising three or four lenses or in tele-objectives—it is contemplated to subject to the adjusting displacement, in an extent correspondingly reduced by levers, only the front lens having a shorter focal length than the total objective, or the front component, while the residual lenses and components are stationary, in a manner conventional in front lens adjustment of photographic cameras.

This results, of course, in some cases in mechanical difficulties, because the lenses turned to the photographic layer, which are closely adjacent to the camera mounting for the base or standard objective, must be held in a fixed position, while a second motion must be derived from the displaceable adjusting mounting. In this case it is more appropriate to firmly connect the lenses on the image side, for example the negative member of tele-objectives, with the mounting for the base or standard objective, so that it takes part in the movement thereof. Accordingly, the invention also contemplates to connect the objective part on the side of the image, with the intermediate member which—owing to its positive coupling or coupling brought about by its form or design—carries out an adjusting movement corresponding to that of the base or standard objective, and to select the lever transmission in accordance with the focal length of the collecting front member, with a slight additional increase which is due to the displacement of the negative member. If for example the system of long focal length, is a tele-objective having a focal length of 100 mm., the collecting front member of which has a focal length of 70 mm., and the negative member of —86 mm. focal length on the image side of which carries out a movement corresponding to that of the base or standard objective, the positive front member has to carry out a movement which corresponds only to about 2.4 times the movement of the base objective. This movement is composed of the displacement of an objective of 70 mm. focal length (corresponding to that of the positive front member) and of the amount by which the intermediate image projected by the negative member to the sensitive plane, moves relative to the camera, when the negative system is displaced by the amount corresponding to that of the base or standard objective.

Figures 1–5 illustrate some embodiments of the invention, to which the invention is not limited.

Figure 2:
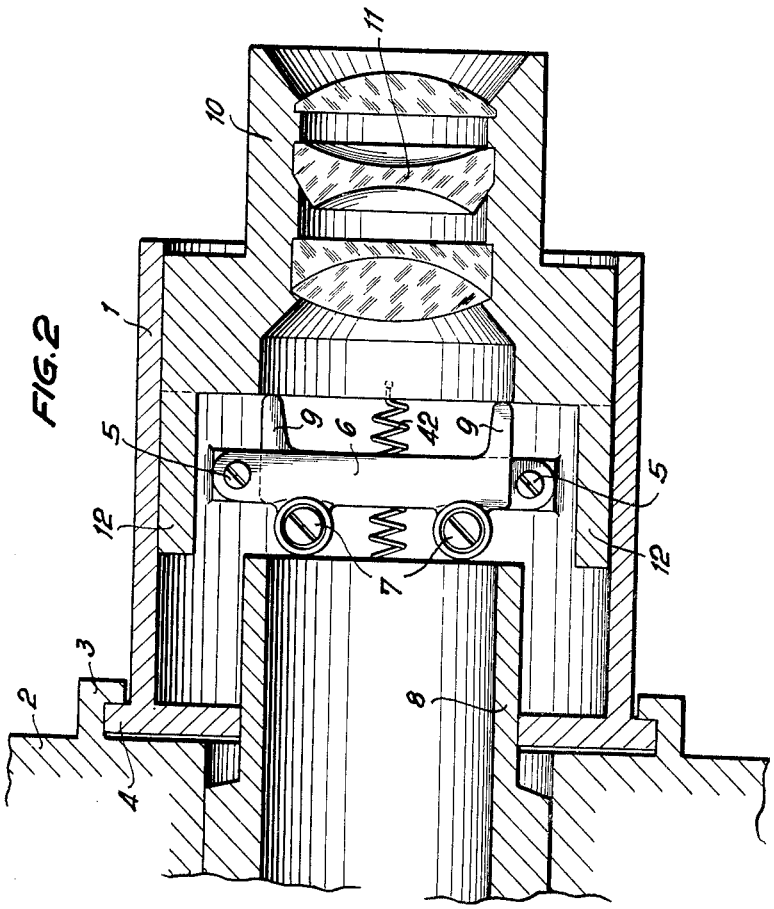

Figure 1 illustrates an embodiment in front view of the camera and Figure 2 is an axial sectional view along line A—B of Figure 1. Another embodiment is shown in axial, sectional view in Figure 3, while Figure 4 is a sectional view along line C—D of Figure 3. Figure 5 illustrates a further embodiment in axial sectional view.

Referring now to the drawings in detail, tube 1 is fastened to the front plate of camera 2 by means of several hooks 3 and registering flaps 4. In tube 1, one-armed levers 6 are connected at pivots 5 and said levers are either cranked, or are arranged at different distances from the optical axis. By means of rollers 7 they lie against ring 8, which usually receives the base objective of standard focal length and is capable of carrying out the adjusting movements tuned with the range finder. The suitably designed end portions 9 of levers 6 bring about advance of cylinder 10, which glides in tube 1 and houses objective 11 of the longer focal length. In order to improve guide of cylinder 10 in tube 1, cylinder 10 is provided with extension elements 12, which extend past pivots 5 and lie against unused portions of tube 1.

Figure 3:
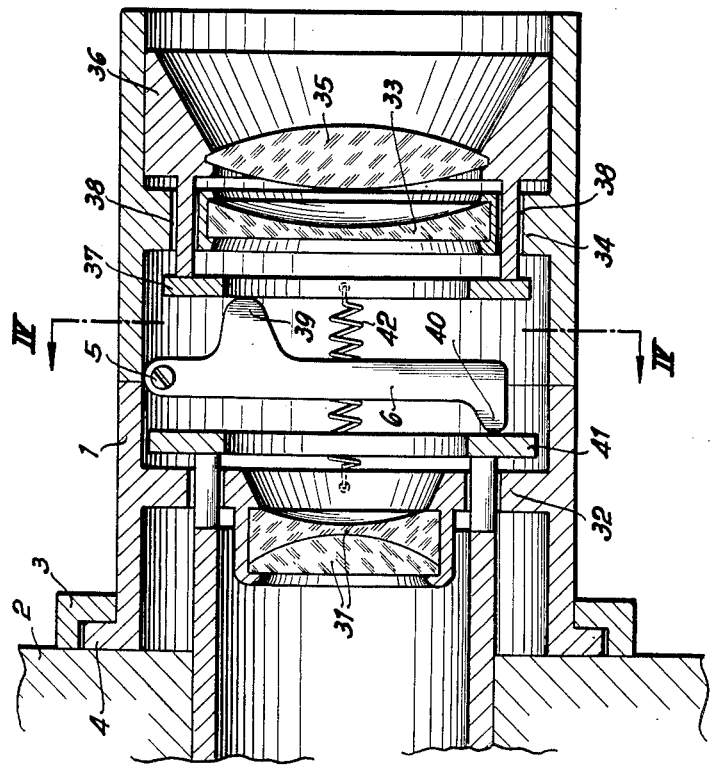
Figure 4:
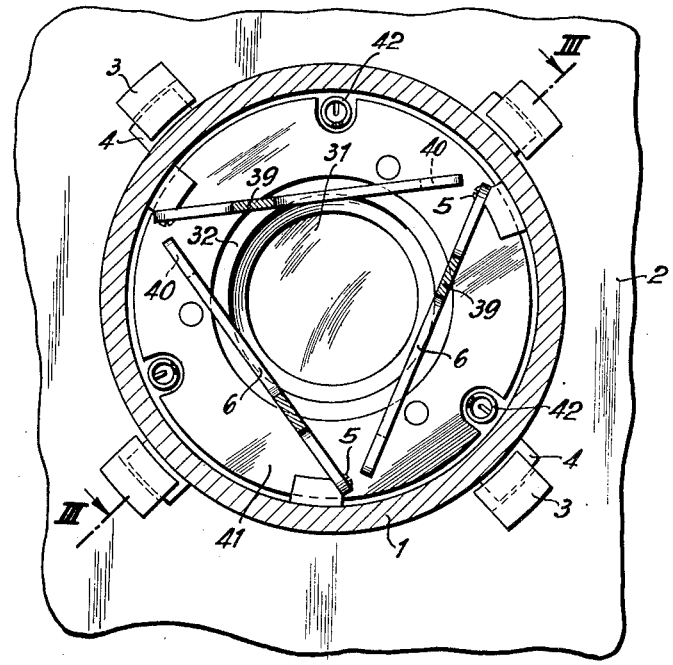
Figure 5:
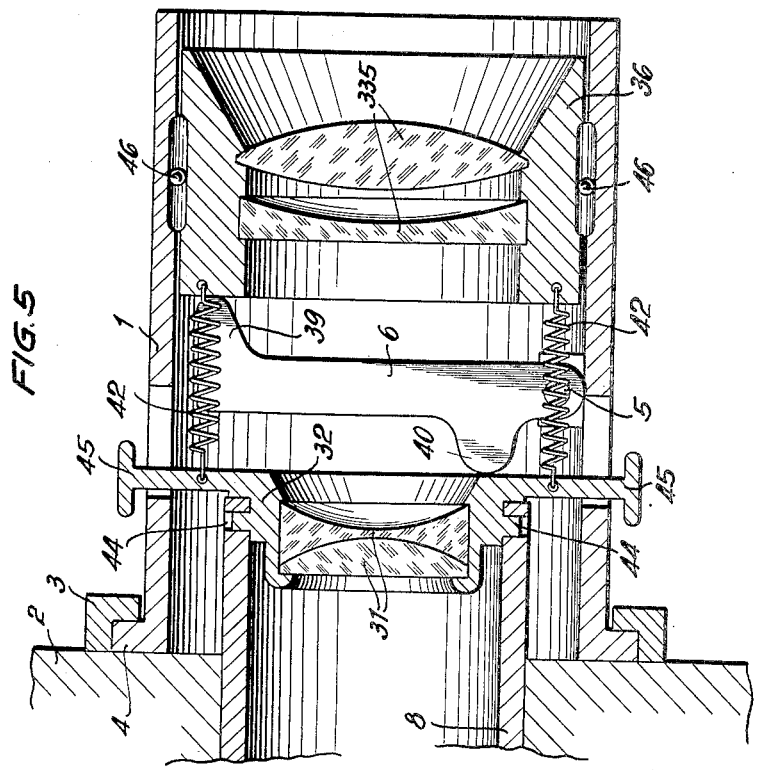

In the embodiment illustrated in Figures 3 and 4, tube 1, camera front wall 2, bayonet elements 3 and 4, as well as pivots 5 for the three levers 6, which enclose the path of rays, in the form of a triangle, correspond to the analogous elements shown in Figures 1 and 2. The objective, which is of a tele-system in this embodiment consists on the side of the sensitive layer of a negative member 31, which is rigidly fastened by means of intermediate mounting 32 in tube 1, and of a collecting front member, consisting of negative lens 33, which is fixedly arranged in tube 1 by means of mounting 34 and of collecting front lens 35, the mounting 36 of which can be displaced in tube 1 by means of transmission bridge 37, which passes through bores 38 of lens mounting 34. Said bridge 37 lies against cam 39 of levers 6, by which the length of the levers is determined. These levers are controlled over ends 40 by bridge 41, which projects through mounting 32 and is in positive connection with ring 8, which, when connected with the camera, is capable of imparting to the base or standard objective, the proper movement. Several radially distributed tension springs 42 serve to establish this positive connection and to eliminate play.

This adjustment of front lenses is of considerable advantage mechanically, because it requires only small movements, but it has certain optical disadvantages which are eliminated in the embodiment shown in Figure 5, in which partially corrected systems of the objective, i. e. front component 335 and negative member 31, are moved toward each other. In this embodiment, negative system 31 is connected with adjusting tube 8 of the camera, by means of bayonet device 44, which can be actuated by means of handles 45 projecting from tube 1, by turning or application of pressure. Thus, lenses 31 take part in adjustment of the base or standard objective. Tension springs 42 prevent play and balls 46 reduce, in known manner, friction of parts moving against each other.

It will be understood from the above that the present invention results in an essential improvement in comparison with known constructions used in connection with exchangeable objectives having different focal lengths.

The object of the present invention is the application of substitute objectives, in place of the standard objective normally used in the camera, without the necessity of changing the adjustment of the range finder, i. e. by using the same scale of distances as in the case of the standard objective.

A further object of the invention is to effect the necessary increase or reduction of the displacement applied to the standard objective, by axial displacement only, i. e. without rotary motion of the objective to be adjusted.

These objects are accomplished by using (a) an outer mounting member, preferably a tube and (b) a second mounting member housed by and axially displaceable in said outer mounting member, which is fixedly connected with the camera. The device according to the invention comprises a gear for automatically coupling the carrier of the standard objective with the substitute objective. Depending on whether the focal length of the substitute objective is longer or shorter than the focal length of the standard objective, said gear is either an additive or reducing gear which converts the permanent displacement occurring during sharp focusing with the camera, into the larger or smaller displacement, as required by the respective substitute objective.

It will be understood that this invention is not limited to the specific elements, arrangements, steps and other specific details described above and can be carried out with various modifications without departing from the scope of the invention as defined in the appended claims.

What is claimed is:

1. A device for use in combination with exchangeable or substitute objectives of photographic cameras having a range finder coupled with means built-in in the camera, for sharp focusing of a standard objective having a predetermined focal length, said device comprising a mounting member for a substitute objective having a focal length different from that of the standard objective, said member being fixedly connected with the body of the camera, a movable member connected with a camera element adapted to be axially displaced, without rotary motion, for sharp focusing of the standard objective; at least one lever system arranged within said mounting member for transmitting motion of said movable member, at a modified scale, to at least one part of the substitute objective and causing axial displacement of the latter by an amount, the ratio of which to the corresponding displacement of the standard objective, is approximately equal to the ratio of squares of the focal lengths of the substitute objective member to be displaced and that of the standard objective, respectively.

2. A device as claimed in claim 1, in which the mounting member consists of a guide tube adapted to be fixedly but releasably connected with the camera by a bayonet lock.

3. A device as claimed in claim 1, in which the transmission lever system is connected, at least positively by spring effect, with the camera element for sharp focusing.

4. A device as claimed in claim 1, in which the lever system is connected, by engagement brought about by the form of the engaging members, with the camera element for sharp focusing.

5. A device as claimed in claim 1, in which the lever system is connected by a bayonet ring to be actuated from the outside, with the camera element for sharp focusing.

6. A device as claimed in claim 1, comprising three similar transmission levers symmetrically enclosing the optical axis.

7. A device as claimed in claim 1, comprising a lever system consisting of four levers arranged pair-wise on two sides of the optical axis opposite each other.

8. A device as claimed in claim 1, in which a substitute objective comprising an adjustable front lens member combined with additional lenses is used and said front lens member is controlled by the lever system, while said additional lenses are rigidly connected with the mounting member.

9. A device as claimed in claim 1, in which the mounting member consists of a guide tube adapted to be fixedly but releasably connected with the camera by a bayonet lock, and in which a substitute objective comprising an adjustable front lens member combined with additional lenses is used and said front lens member is controlled by the lever system, while said additional lenses are rigidly connected to the guide tube.

10. A device as claimed in claim 1, in which the mounting member consists of a guide tube adapted to be fixedly but releasably connected with the camera by a bayonet lock and in which a tele-objective having a positive lens member and a negative lens member is used, and adjustment of the positive member is controlled in accordance with its focal length, while the negative member is rigidly connected with the guide tube.

11. A device as claimed in claim 1, in which a substitute objective capable of front lens adjustment and comprising in addition to a front lens additional lenses, is used, and the front lens adjustment is controlled by the lever system, while the additional lenses are fixedly coupled with the axially displaceable movable member for sharp focusing, of the camera.

12. A device as claimed in claim 1, in which a tele-objective having a positive lens member and a negative lens member is used, and adjustment of the positive member is controlled by the lever system and the negative lens member is coupled with the axially displaceable movable member for sharp focusing, of the camera.

13. A device as claimed in claim 1, in which the lever parts acting on objective elements, are under spring impulse in order to connect said lever parts with said objective elements positively and without play.

14. A device as claimed in claim 1, in which friction in pivots of the levers and friction between elements axially displaceable in the mounting member is reduced by ball bearings.

HELMUT NAUMANN.

No references cited.